| United States Patent [19] | [11] 3,839,269 |
| Comegys | [45] Oct. 1, 1974 |

[54] SELF SUPPORTING CEMENT

[76] Inventor: Cornelius W. Comegys, 2029 Kenmore, Los Angeles, Calif. 90027

[22] Filed: Dec. 23, 1971

[21] Appl. No.: 211,434

[52] U.S. Cl. ..... 260/41 R, 260/29.6 S, 260/29.6 PS
[51] Int. Cl. ......................... C08f 45/04, C08f 45/24
[58] Field of Search ....... 260/29.6 S, 41 A, 29.6 PS, 260/41 R; 106/111, 90

[56] References Cited
UNITED STATES PATENTS

| 2,426,147 | 8/1947 | Horn | 106/111 X |
|---|---|---|---|
| 2,790,724 | 4/1957 | Bergman | 106/90 |
| 2,905,566 | 9/1959 | Schmidt | 260/29.6 S X |
| 3,256,229 | 6/1966 | Janota et al. | 260/29.6 S |
| 3,538,036 | 11/1970 | Peters | 260/29.6 S |
| 3,725,097 | 4/1973 | Peppler | 106/90 |

*Primary Examiner*—Allan Leiberman
*Assistant Examiner*—P. R. Michl
*Attorney, Agent, or Firm*—Nilsson, Robbins, Bissell, Dalcarn & Berliner

[57] ABSTRACT

A self supporting cement comprising inorganic cementitious material as the major constituent, a setting agent therefor and a minor, binding amount of an anhydrous vinyl ether polymer. In particular, poly(methyl vinyl ether-maleic anhydride) is mixed with an aluminum oxide and the mixture combined with gypsum containing silica, as a filler, to provide a composition which upon the addition of water sets quickly with little or no shrinkage.

14 Claims, No Drawings

SELF SUPPORTING CEMENT

FIELD OF THE INVENTION

The fields of art to which the invention pertains include the fields of cementitious materials and cementiouspolymer materials.

BACKGROUND AND SUMMARY OF THE INVENTION

In the normal use of a calcined gypsum formulation, a cementitious mass is produced which is generally flowable and not self supporting. It is believed that when water is added to dry plaster, the plaster grains become surrounded by a film of water filling the spaces between the grains. As additional water is added, the grains float apart until the grain friction has been reduced sufficiently to allow the mass to be mixed. As mixing proceeds, colloidal gypsum precipitates, apparently as a result of supersaturation of the water with cement. The fine gypsum crystals are believed to serve as nuclei for the further deposition and growth of larger gypsum particles taking the form of needles which grow and interlock among each other to develop coherence. At that point the mass has "set," normally requiring from 25-35 minutes. Hydration of the plaster to gypsum continues to take place for approximately 24 hours.

Although 100 lbs. of plaster requires only 18.6 lbs. of water to form gypsum, more than this amount of water is necessary to float the plaster grains apart to make a fluid mix. Water in excess of the theoretical amount acts to keep the gypsum crystals apart so that until the gypsum crystals have grown sufficiently long to interlock, the plaster is flowable. This is satisfactory for horizontal plastering, but is generally unsatisfactory for plastering vertical or overhead surfaces. Accordingly, to plaster such surfaces, the amount of water added must be more exactly controlled and the plaster troweled unto a supporting structure such as wire netting, and worked until set sufficiently to be self supporting.

The present invention provides a cementitious composition which is self supporting without requiring exactitude in the amount of water added. The composition provided herein mixes readily with water, sets quickly, in 12-15 minutes, with little or no shrinkage and its strength is greater than normal concrete. When mixed to a trowelable mortar it has a stickiness sufficient to hold ornamental parts, such as tile, when placed on a vertical surface. This stickiness and self supportiveness facilitates the patching of chipped concrete corners without the use of forms and enables ready patching on overhead surfaces such as ceilings. It can be used to set reinforcing rods and concrete forms, for holding electric junction boxes, corner beams and metal trim. The composition allows metal threshholds, doors and window frames to be permanently and quickly set. Its high strength and quick setting characteristics make it ideal for setting and repairing marble slabs, tables or counters and odd shaped objects. It can be readily used for grouting or bedding-in heavy machinery, and generally for any patching or plastering situation where its high strength and self supporting characteristics are advantageous.

Specifically, the present invention provides a self supporting cement comprising inorganic cementitious material as the major constituent, a setting agent for the cementitious material and a minor, binding amount of a vinyl ether polymer. A silica filler can be added to extend the cementitious material. In formulating the self supporting cement, the setting agent and vinyl ether polymer should be preferably mixed together and then the mixture added to the cementitious material which can be premixed with the silica filler, if present.

While it is not intended to rely on any particular theory of operation, it is believed that the vinyl ether polymer serves to quickly form a supporting matrix for the cementitious material, holding it in place until it has obtained sufficient set. Aside from these polymer functions, the ether component of the polymer appears to serve as a "water-sink" allowing the take-up of water which would otherwise impart undesirable flow properties to the cementitious material, yet allowing a rapid buildup of particle size and interlocking of cementitious grain. In this regard, it is preferred that the vinyl ether polymer also be an anhydride, enhancing the water absorbing function. A preferred polymer is poly(methyl vinyl ether-maleic anhydride).

DETAILED DESCRIPTION

As required, details of illustrative embodiments of the invention are disclosed. However, it is to be understood that these embodiments merely exemplify the invention which may take forms different from the specific illustrative embodiments disclosed. Therefore, specific structural and functional details are not necessarily to be interpreted as limiting, but as a basis for the claims.

As above indicated, the self supporting cement includes as the major constituent an inorganic cementitious material. As such material, one can use any inorganic binder material which is cementitious in nature such as gypsum cement (including forms such as beta and alpha gypsum), Portland cement (including any of the Types I-V), magnesium oxysulfate, magnesium oxychloride, zinc oxysulfate, zinc oxychloride, magnesium oxyphosphate, zinc oxyphosphate, alumnite cement, methyl silicates such as calcium silicate and aluminum silicate, pozzolanic cements and colloidal silicic acid. Gypsum cement ($CaSO_4 \cdot 0.5H_2O$) is preferred material most readily providing desired density, strength and setting properties. The alpha form of gypsum cement is particularly preferred for its strength characteristics.

Silica ($SiO_2$) can be added as a filler for the cementitious material and common sand can be used for this purpose. Generally, an amount up to the amount of cementitious material can be added. The silica is added directly to the cementitious material prior to blending of the other components.

A setting agent and vinyl ether polymer are added. These components are premixed together so as to extend the polymer and assure uniform distribution when mixed with the inorganic cementitious material. By the term "setting agent" is meant any material which serves to speed the set of the inorganic cementitious material and in this regard materials known in the art as accelerators can be used or one can use a fast setting component such as alumina (aluminum oxide) cement. Examples of accelerators include aluminum sulfate, magnesium sulfate, ammonium chloride, calcium chloride, sodium chloride, sodium sulfate, sodium hydroxide, sodium sulfite, potassium sulfate and potassium hydroxide. Alumina cement is well known to the art and is preferred for its expanding properties resulting in little or no shrinkage of the final composition. Alumina cement is obtained from the reaction of a calcium aluminate, such as bauxite, and calcium carbonate such as limestone, to yield a material having about 35-45 percent lime, 35-45 percent alumina and 3-15 percent silica. When an accelerator as such is utilized, generally about 0.1-2 parts thereof per 100 parts of inorganic cementitious material is a satisfactory range. When an alumina cement is utilized, generally about 2-12 parts thereof per 100 parts of inorganic cementitious material is a satisfactory range.

The vinyl ether polymer is an organic polymer material defined by repeating units having the formulation

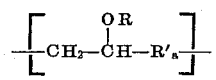

wherein R is a lower alkyl, R' is a bivalent organic radical and $a$ is 0 or 1. Examples of lower alkyls include methyl, ethyl, propyl and butyl and isomeric forms thereof. R' comprehends any organic radical having two valence sites, preferably containing 1-12 carbon atoms, but substitutional derivatives are also included. Such radicals include, without limitation but by way only of example, hydrocarbons such as methylene, ethylene, trimethylene, tetramethylene, pentamethylene, hexamethylene, ethylethylene, propylene, vinylene, trimethylenylene and phenylene, acids such as pentanoic aacid, maleic acid and fumaric acid, esters thereof such as the methyl, ethyl, propyl, butyl and phenyl esters, anhydrides thereof such as maleic anhydride, and the like.

The anhydrides are preferred, and particularly poly(-methyl vinyl ether-maleic anhydride), which has the repeating units

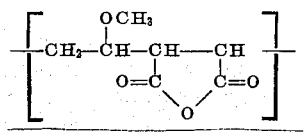

Generally about 0.1-1.5 parts of the vinyl ether polymer per 100 parts of inorganic cementitious material is a satisfactory range.

The fully formulated mixture of dry ingredients are used by adding about 1 percent of water to 4 parts of the formulation. Adding somewhat more water will provide a pourable mix about the consistency of thick batter. Generally, about 0.25 parts-2 parts of water can be added for every 4 parts of dry formulation. The addition of extra water somewhat reduces the strength of the set cement The following examples, in which all parts are by weight, will illustrate the invention.

EXAMPLE 1

A first portion of dry ingredients were prepared by intimately and thoroughly mixing 0.6 parts of poly(-methyl vinyl ether-maleic anhydride), sold by General Aniline & Film under the trade name of Gantrez 149, with 6.0 parts of aluminum oxide cement sold under the trade name Lumnite. A second portion of dry ingredients were prepared by intimately and thoroughly mixing 50 parts of No. 90 silica with 100 parts of a high strength gypsum cement sold by U.S. Gypsum under the trade name Hydro-stone. The first and second portions were then intimately and thoroughly mixed together to form a dry cementitious material. To 4 parts of this dry mixture were added 1 part of water with mixing to form a trowelable mortar. The mortar formed a soft gel which was completely self supporting and started to set firmly 10-15 minutes after first mixing, coming up to full strength after 24 hours.

EXAMPLE 2

The procedure and formulation of Example 1 can be followed except that the silica can be omitted, still providing a cement which is self supporting and which can be used to patch vertical or overhead surfaces and to support objects in place on a wall.

EXAMPLE 3

The procedure of Example 1 can be followed but in place of the alumina oxide cement, one can utilize 1 part of calcium chloride to provide a formulation which will rapidly set but which will exhibit a small degree of shrinkage.

I claim:

1. A self supporting cement, comprising:
    gypsum cement as the major constituent;
    from about 0.1 part to about 12 parts by weight of a setting agent, for speeding the set of said gypsum cement, per 100 parts by weight of said gypsum cement, said setting agent being selected from the group consisting of aluminum oxide, aluminum sulfate, magnesium sulfate, ammonium chloride, calcium chloride, sodium chloride, sodium sulfate, sodium hydroxide, sodium sulfite, potassium sulfite and potassium hydroxide; and
    from about 0.1 part to about 1.5 parts by weight of an anhydrous vinyl ether polymer per 100 parts by weight of said gypsum cement.

2. The cement of claim 1 including silica as a filler therefor.

3. The cement of claim 1 in which said vinyl ether polymer is poly(methyl vinyl ether-maleic anhydride).

4. The cement of claim 1 in which said setting agent comprises aluminum oxide.

5. The cement of claim 1 having the formulation in parts by weight:

| | |
|---|---|
| $CaSO_4 \cdot 0.5H_2O$ | 100 |
| silica | 0-100 |
| setting agent | 0.1-12 |
| anhydrous vinyl ether polymer | 0.1-1.5 |

6. The cement of claim 1 having the formulation, in parts by weight

| | |
|---|---|
| $CaSO_4 \cdot 0.5H_2O$ | 100 |
| silica | 0-100 |
| setting agent selected from the group consisting of aluminum oxide, aluminum sulfate, magnesium sulfate, ammonium chloride, calcium chloride, sodium chloride, sodium sulfate, sodium hydroxide, sodium sulfite, potassium sulfite and potassium hydroxide. | 0.1-12 |
| poly(methyl vinyl ether-maleic anhydride) | 0.1-1.5 |

7. The cement of claim 6 in which said setting agent comprises aluminum oxide.

8. The cement of claim 1 having the formulation, in parts by weight

| | |
|---|---|
| $CaSO_4 \cdot 0.5H_2O$ | 100 |
| silica | 50 |
| aluminum oxide | 2–12 |
| poly(methyl vinyl ether-maleic anhydride) | 0.6 |

9. The cement of claim 8 in which said aluminum oxide is present in 6 parts by weight.

10. A method for making a self supporting cement having gypsum cement as its major constituent, comprising:

mixing from about 0.1 part to about 12 parts by weight of a setting agent for said gypsum cement with from about 0.1 part to about 1.5 parts by weight of an anhydrous vinyl ether polymer to form a substantially uniform mixture thereof, said setting agent being selected from the group consisting of aluminum oxide, aluminum sulfate, magnesium sulfate, ammonium chloride, calcium chloride, sodium chloride, sodium sulfate, sodium hydroxide, sodium sulfite, potassium sulfite and potassium hydroxide; and then combining said mixture with 100 parts by weight of said gypsum cement and mixing to form a substantially uniform combination thereof.

11. The method of claim 10 including the step of mixing silica with said gypsum cement prior to formation of said combination.

12. The method of claim 10 in which about 2–12 parts of said setting agent and about 0.1–1.5 parts of anhydrous vinyl ether polymer are mixed together and then combined with about 100 parts of gypsum as said gypsum cement.

13. The method of claim 12 in which said anhydrous vinyl ether polymer is poly(methyl vinyl ether-maleic anhydride).

14. The method of claim 12 in which said setting agent comprises aluminum oxide.

* * * * *

UNITED STATES PATENT OFFICE
CERTIFICATE OF CORRECTION

PO-1050
(5/69)

Patent No. 3,839,269　　　　　　　　Dated October 1, 1974

Inventor(s) Cornelius W. Comegys

It is certified that error appears in the above-identified patent and that said Letters Patent are hereby corrected as shown below:

Column 1, line 6, change "titiouspolymer" to --titious-polymer--.

Column 2, line 44, after "is" add --a--.

Column 3, line 31, change "aacid" to --acid--.

Column 3, line 50, change "percent" to --part--.

Signed and sealed this 17th day of December 1974.

(SEAL)
Attest:

McCOY M. GIBSON JR.　　　　　　　C. MARSHALL DANN
Attesting Officer　　　　　　　　Commissioner of Patents